Patented June 11, 1929.

1,717,250

UNITED STATES PATENT OFFICE.

JOHN J. PHELAN, OF TROY, NEW YORK, ASSIGNOR TO GENERAL ELECTRIC COMPANY, A CORPORATION OF NEW YORK.

BRAZING FLUX.

No Drawing.   Application filed June 19, 1928.  Serial No. 286,715.

The present invention relates to a brazing flux and more particularly to a flux adapted to be employed in brazing chromium alloys such, for example, as iron-chromium and iron-nickel-chromium alloys. Heretofore it has been extremely difficult to braze such materials owing to the tendency of the chromium alloys to oxidize and thus prevent the brazing material from wetting the surfaces of the structures to be brazed. It is one of the objects of the present invention to provide a brazing flux which is of general utility and suitable for use not only in brazing chromium alloys but in brazing or soldering other metals such as copper and iron if desired.

In carrying the invention into effect, I employ a mixture consisting of varying amounts of an alkali acid fluoride and an alkali tetraborate depending on the materials to be brazed. For example, in brazing chromium alloys, a very satisfactory result is obtained by employing a flux containing above 50 to 60% by weight of potassium acid fluoride (KHF$_2$) and about 50 to 40% by weight of potassium tetraborate (K$_2$B$_4$O$_7$).

If metals other than chromium alloys are to be brazed the composition of the flux may be further varied. In brazing copper and iron, for example, I have employed a flux consisting of about 25% potassium acid fluoride with about 75% potassium tetraborate and obtained very good results.

In preparing the flux, the fluoride and borate powders are mixed with enough water to form a paste which is applied with a brush, and as a thin film to the surfaces to be brazed. The surfaces thus treated are then heated to a temperature high enough to melt commercial silver solder, which is ordinarily employed as the brazing metal. The molten solder flows onto the surfaces coated with the flux and makes a very firm joint therewith. In the brazing operation, I have found it advantageous although not absolutely necessary to apply a small amount of the powdered flux to the silver solder before the latter is melted onto the surfaces to be brazed.

The potassium acid fluoride in the flux serves to cleanse the surfaces while the potassium tetraborate covers and fuses to the surfaces to be brazed thereby preventing oxidation. If desired other alkali fluorides and borates may be substituted for those indicated above. I have found however that the best results are obtained when potassium acid fluoride and potassium tetraborate are employed.

While I have employed the present flux in silver brazing chromium alloys, the invention is not limited to the use of silver as the brazing material. For example, steel dies containing about 2% carbon and about 12% chromium have been copper brazed. In this case the die was copper plated to prevent loss of the carbon, the flux applied to the surfaces to be brazer, and the structure copper brazed in a hydrogen atmosphere in the usual manner, providing a very firm brazing joint.

What I claim as new and desire to secure by Letters Patent of the United States, is:

1. A brazing flux consisting of at least 25% potassium acid fluoride and at least 40% potassium tetraborate.

2. A brazing flux containing about 60% potassium acid fluoride and about 40% potassium tetraborate.

3. A brazing flux containing about 25% to about 60% alkali acid fluoride and about 75% to about 40% alkali tetraborate.

4. A flux containing about 25% to about 60% alkali acid fluoride and about 75% to about 40% alkali borate.

In witness whereof I have hereunto set my hand this 16th day of June, 1928.

JOHN J. PHELAN.

CERTIFICATE OF CORRECTION.

Patent No. 1,717,250.                    Granted June 11, 1929, to

JOHN J. PHELAN.

It is hereby certified that error appears in the printed specification of the above numbered patent requiring correction as follows: Page 1, line 22, for the word "above" read "about", and line 66, same page, for "brazer" read "brazed"; and that the said Letters Patent should be read with these corrections therein that the same may conform to the record of the case in the Patent Office.

Signed and sealed this 30th day of July, A. D. 1929.

(Seal)                                                    M. J. Moore,
                                                       Acting Commissioner of Patents.